Feb. 21, 1967 T. M. ASHER 3,304,784
APPARATUS FOR MEASURING MINUTE AMOUNTS OF FLUIDS
Filed March 24, 1964

INVENTOR.
THOMAS M. ASHER
BY
ATTORNEY

United States Patent Office 3,304,784
Patented Feb. 21, 1967

3,304,784
APPARATUS FOR MEASURING MINUTE
AMOUNTS OF FLUIDS
Thomas M. Asher, Studio City, Calif., assignor to
Hyland Laboratories
Filed Mar. 24, 1964, Ser. No. 354,233
2 Claims. (Cl. 73—425.4)

The present invention relates to a novel method and apparatus for measuring and delivering minute amounts of fluids. More particularly, it relates to a method and apparatus for measuring and delivering minute amounts of fluids to be assayed by chemical or other methods.

Clinical chemical laboratories perform a large number of assays upon fluid specimens such as blood serum and other biological fluids. Many of these assays, because of the nature of the fluid being assayed, are performed with minute amounts of fluids. Presently, the majority of such laboratories, when performing tests upon such minute amounts of fluids, employ micropipets to measure and deliver such fluids. Such micropipets, as they are extremely small, can only be thoroughly cleaned with difficulty; and, occasionally, the improper cleaning of a micropipet results in either contamination of the specimen or inaccurate test results.

It is an object of the present invention to disclose a novel method for measuring and delivering minute amounts of fluids to be assayed, which method overcomes the disadvantages which accompany the use of micropipets.

It is a further object to disclose a novel apparatus for collecting, measuring, and delivering minute amounts of fluid.

These and still other objects will be apparent from the specification as it proceeds.

It has now been discovered that minute amounts of fluids can be measured and delivered by the method which comprises drawing a portion of the fluid to be measured into an ungraduated capillary tube of uniform inner diameter, temporarily graduating and magnifying that portion of the capillary tube which contains the fluid and then removing from the capillary tube a definite measured amount of the fluid.

It has been further discovered that minute amounts of fluids may be measured and delivered by using an apparatus comprising a capillary tube which has a uniform inner diameter and is open at both ends and a graduating and magnifying device which is provided with a capillary tube receiving means and graduation indicating means.

The preferred method and apparatus of the present invention will be further described in connection with the drawings wherein.

Figure 1:
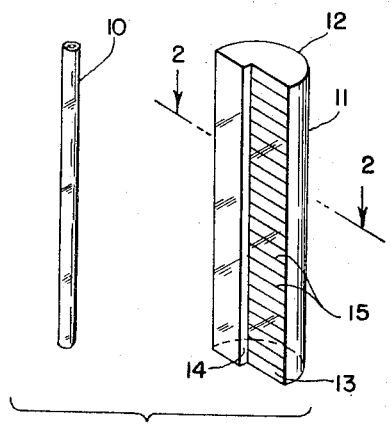
FIGURE 1 is an elevational view of an embodiment of the present invention.

In FIGURE 1 there is shown an embodiment of the apparatus of the present invention which comprises a capillary tube 10 which has a uniform inner diameter and is open at both ends, and a magnifying and graduating means 11. The capillary tube 10 may be made of any clear material such as glass, polystyrene, acrylic resins or similar plastics.

Figure 2:
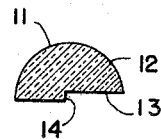
FIGURE 2 is a sectional view of the embodiment of FIGURE 1 taken along lines 2—2 of FIGURE 1.

The magnifying and graduating means 11 is generally in the shape of a semi-cylindrical member. It is provided with one curved wall 12 and a substantially flat wall 13. The flat wall 13 is provided with capillary tube retaining means. In the embodiment shown in the drawings the retaining means comprises a step 14 (as seen in FIGURE 2). The flat surfaces of the wall 13 are provided with graduation indicating means 15, e.g. uniformly spaced lines (usually 1 mm. apart) which are etched or printed on the flat surfaces.

The magnifying and graduating means 11 is preferably formed of a clear plastic material such as polystyrene; however, other material such as glass or acrylic resins or similar transparent resins may be employed. The combination of the curved wall and the flat wall provide for lateral magnification of the uniform capillary tube and its contents when viewed through the curved surface. The capillary tube retaining means, which takes the form in FIGURE 2 of a step 14, may also be formed as a groove or similar indentation. However, the form shown in the drawings is preferred, because it allows the graduation lines to extend past the mid-point of the flat wall so that a capillary tube when placed against the step and viewed through the curved wall will appear to have graduation lines extending across its complete surface, thereby facilitating an accurate reading. Furthermore, with the preferred form of the apparatus, the meniscus of the fluid within the uniform capillary tube becomes magnified, thereby greatly facilitating its accurate alignment with the graduation indicating means.

Figure 3:
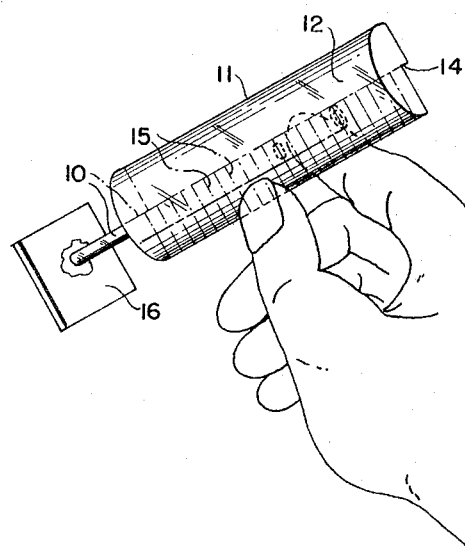
FIGURE 3 is an illustration showing the use of the preferred apparatus.

In the preferred method of the present invention, the capillary tube of uniform inner diameter is dipped into a container holding the fluid to be analyzed or is touched to a drop of fluid, such as blood obtained from a routine finger tip puncture. The capillary tube is tilted slightly toward the horizontal to allow the fluid to rise and fill the capillary tube by virtue of capillary action. The outside surface of the capillary tube is then wiped to remove any surplus fluid. The capillary tube is then placed against the step 14 of the magnifying and graduating means 11 and held in such position in the manner shown in FIGURE 3 of the drawings. The top of the column of the fluid in the capillary tube is then positioned by aligning the meniscus of the fluid in the tube with any chosen graduation upon the graduation indicating means. The fluid within the capillary tube is then delivered by placing the lower end of the tube into contact with an absorbent and chemically clean material 16 (e.g. filter paper). The greater capillary force imposed by the absorbent material causes the fluid to be withdrawn from the tube. By visually following the movement of the meniscus of the fluid within the tube and by relating the meniscus to the graduation indicating means, the amount of fluid which has been withdrawn from the tube can be observed. When the desired column length of fluid has been withdrawn from the tube, the absorbent material is removed from the end of the capillary tube. The fluid can then be removed from the absorbent material by extraction techniques or the desired assay may be performed directly upon the fluid-containing material. The capillary tube used, being inexpensive, is discarded, thereby eliminating the expense of washing and preparation and the possible error inherent in reusing laboratory pipets.

The amount of the fluid delivered from the capillary tube has been readily calculated by the following formula:

$$\text{Volume} = \text{pi} \times \text{inner radius of the tube}^2 \times \text{height of the column}$$

Alternatively the amount of the fluid delivered has been determined by weighing the absorbed material before and after use.

Capillary tubes having varied lengths and varied but known inner diameters may be employed. Especially preferred, however, are capillary tubes having an outer diameter of 0.069 inch±0.002 inch, and an inner diameter of 0.053 inch±0.002 inch and a length of approximately three inches.

To evaluate the accuracy of the apparatus of the present invention a variety of tests were performed employing human serum. The results are found in Table I.

TABLE III

| Commercial Assigned Cholesterol Concentration (Acceptable Range in parenthesis) mg. per 100 ml. | Volumes of Serum Delivered with the Present Invention, ml. | Cholesterol Concentration Obtained with the Present Invention-Triplicate dtmns. mg. per 100 ml. |
|---|---|---|
| 190 (180–200) | 0.040 | 184<br>189<br>186 |
| 395(375–415) | 0.040 | 366<br>380<br>386<br>375<br>372 |
| 395(375–415) | 0.020 | 420<br>366<br>390<br>416 |
| 190(180–200) | 0.040 | 180<br>176<br>180<br>179<br>181 |
| 200(190–210) | 0.040 | 200<br>200<br>200<br>190<br>205 |
| 210(200–220) | 0.020 | 203<br>205<br>211 |

TABLE I

| Glass Capillaries | Number of Capillaries Tested | Column of Serum Delivered, mm. | Average Wt. of Column Delivered, mg. | Standard Deviation, mg. | Coefficient of Variation (std. dev./aver. wt.×100), Percent |
|---|---|---|---|---|---|
| 0.069"±0.002" outer diameter, 0.053"±0.002" inner diameter, length 3" | 20 | 30 | 28.9 | 0.76 | 2.7 |
| 0.045"±0.002" outer diameter, 0.060"±0.002" inner diameter, length 3" | 25 | 40 | 41.5 | 0.77 | 1.9 |

The accuracy of chemical assays performed upon serum and blood, using the apparatus and method of the present invention, was compared to results obtained using conventional micropipets and conventional Sahli pipets. The results of those tests are shown in Table II.

TABLE II

| Specimen No. | Blood Hemoglobin Values (Grams per 100 ml.) | | | Correlation Coefficient |
|---|---|---|---|---|
| | Application of Present Invention | Using Conventional | | |
| | | Micropipets | Sahli Pipets | |
| 1 | 13.7 | | 13.4 | |
| 2 | 23.5 | | 23.1 | |
| 3 | 19.7 | | 19.5 | |
| 4 | 30.3 | | 25.6 | |
| 5 | 15.5 | | 15.1 | |
| 6 | 14.5 | | 14.7 | 0.883 |
| 7 | 16.8 | | 16.3 | |
| 8 | 13.4 | | 13.6 | |
| 9 | 17.7 | | 17.7 | |
| 10 | 20.3 | | 20.1 | |
| 11 | 14.4 | 13.7 | | |
| 12 | 12.1 | 11.9 | | |
| 13 | 13.7 | 13.4 | | |
| 14 | 10.0 | 10.1 | | |
| 15 | 5.6 | 5.3 | | |
| 16 | 13.3 | 12.5 | | |
| 17 | 17.4 | 16.6 | | 0.994 |
| 18 | 11.5 | 10.9 | | |
| 19 | 11.5 | 9.7 | | |
| 20 | 8.6 | 8.2 | | |
| 21 | 10.7 | 11.4 | | |
| 22 | 11.1 | 10.7 | | |

To further evaluate and substantiate the accuracy and reproducible of the method and apparatus of the present invention, tests were performed to determine serum cholesterol values, and the values obtained were compared to those obtained by conventional techniques employed by clinical chemical laboratories. The results of that comparison are found in Table III.

From the foregoing it will be readily apparent to those skilled in the art that the novel method and apparatus of the present invention provides substantial advantages over the previous practices.

It is to be understood that a number of variations and changes may be made without departing from the spirit and scope of the present invention.

What I claim is:

1. An apparatus for measuring and delivering a minute amount of fluid, said apparatus comprising an ungraduated capillary tube of known inner diameter and open at both ends and means of temporarily magnifying and graduating said tube, said means comprising a generally semi-cylindrical transparent member having a curved wall and a substantially flat wall, the substantially flat wall of said member being provided with capillary tube retaining means and with graduation indication means, said retaining means comprising a step formed in the substantially flat wall.

2. An apparatus for measuring and delivering a minute amount of fluid, said apparatus comprising an ungraduated capillary tube of known inner diameter and open at both ends and means for temporarily magnifying and graduating said tube, said means comprising a generally semi-cylindrical transparent member having a graduated wall and a substantially flat wall, the substantially flat wall of said member being provided with capillary tube retaining means and with graduated indication means, said capillary tube retaining means comprisiing a rabbet formed in the substantially flat wall to retain the tube adjacent the graduations.

References Cited by the Examiner

UNITED STATES PATENTS

| 2,319,556 | 5/1943 | Rheim | 206—63.2 |
| 2,389,282 | 11/1945 | Stegeman. | |
| 2,405,418 | 8/1946 | Fukal | 88—39 X |
| 2,586,581 | 2/1952 | Tschischeck | 88—39 |
| 2,736,097 | 2/1956 | Coleman | 88—39 |
| 3,204,446 | 9/1965 | Cooke | 73—1 |

OTHER REFERENCES

Benedetti-Pichler, Introduction to the Microtechnique of Inorganic Analysis, John Wiley, New York, 1942, pages 38, 39 and 40.

LOUIS R. PRINCE, *Primary Examiner.*

S. CLEMENT SWISHER, *Assistant Examiner.*